United States Patent [19]
Wagner

[11] Patent Number: 4,740,999
[45] Date of Patent: Apr. 26, 1988

[54] NOISE IMMUNITY WINDOW CIRCUIT

[75] Inventor: Steven D. Wagner, San Jose, Calif.

[73] Assignee: Ampex Corporation, Redwood City, Calif.

[21] Appl. No.: 788,596

[22] Filed: Oct. 17, 1985

[51] Int. Cl.$^4$ .............................................. H04L 7/06
[52] U.S. Cl. .................................... 375/111; 375/119; 375/102; 328/155
[58] Field of Search ........ 375/102, 103, 111, 118–120; 358/36, 167, 155, 336, 337, 340; 328/155, 63, 60; 360/37.1, 38.1

[56] References Cited

U.S. PATENT DOCUMENTS

| | | | |
|---|---|---|---|
| 3,684,967 | 8/1972 | Kelly | 375/95 |
| 3,860,952 | 1/1975 | Tallent et al. | 358/19 |
| 4,005,476 | 1/1977 | Dickopp et al. | 358/337 |
| 4,028,729 | 6/1977 | Browder | 358/340 |
| 4,074,307 | 2/1978 | Dischert et al. | 358/337 |
| 4,196,416 | 4/1980 | Stein | 375/111 |
| 4,203,076 | 5/1980 | Yamashita | 358/158 |
| 4,220,968 | 9/1980 | Scholz | 358/337 |
| 4,459,621 | 7/1984 | Okano | 358/340 |
| 4,614,973 | 9/1986 | Sorenson | 358/155 |

Primary Examiner—Robert L. Griffin
Assistant Examiner—Marianne Huseman
Attorney, Agent, or Firm—Nat Kallman; George B. Almeida; Richard P. Lange

[57] ABSTRACT

A noise immunity circuit incorporates a first channel for tracking a train of periodic sync pulses and for locking a window to said pulses for rejecting spurious noise signals. A second channel senses when the sync pulses are displaced in phase and establishes a new rephased window that is in phase with the displaced sync pulses.

13 Claims, 2 Drawing Sheets

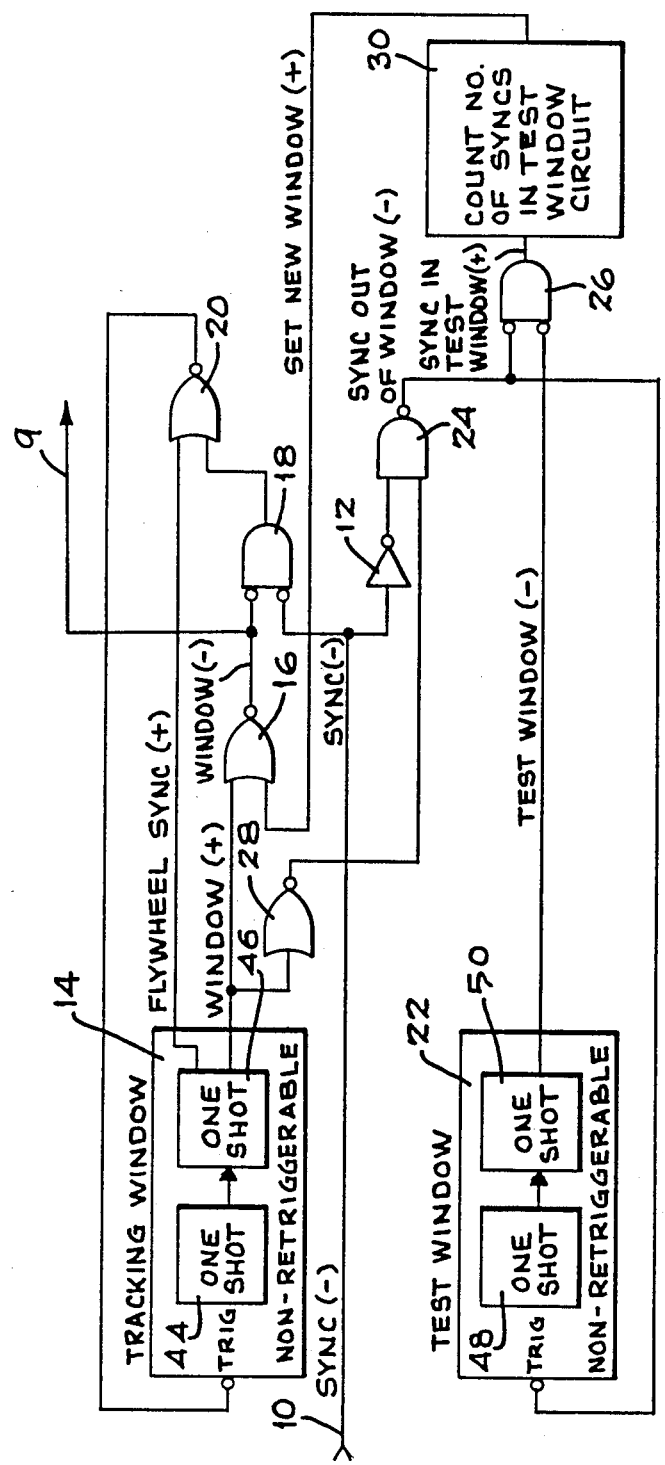
FIG_1

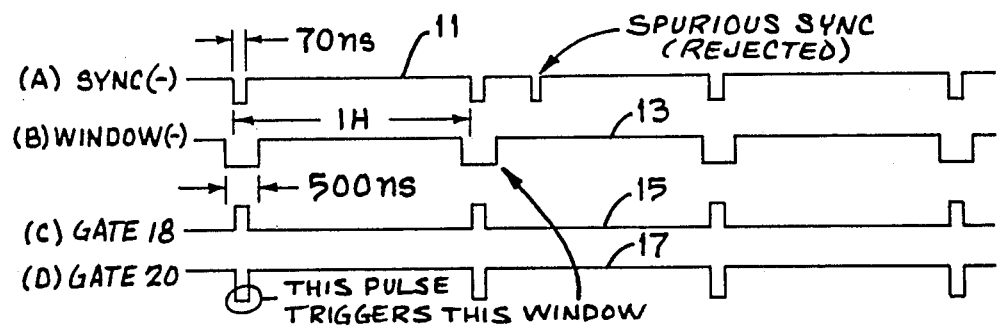
FIG_2
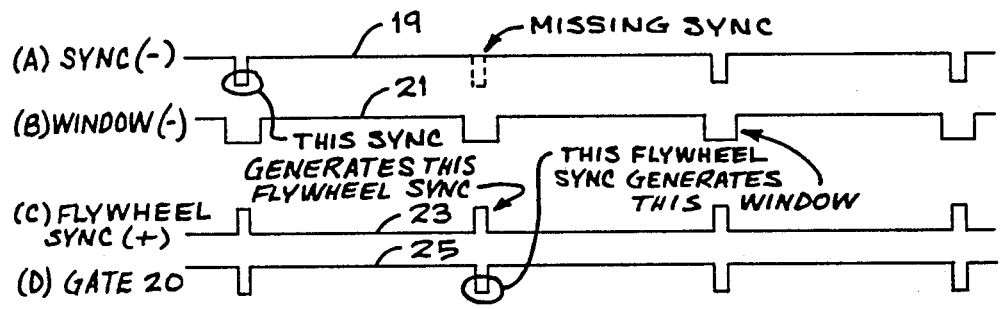
FIG_3
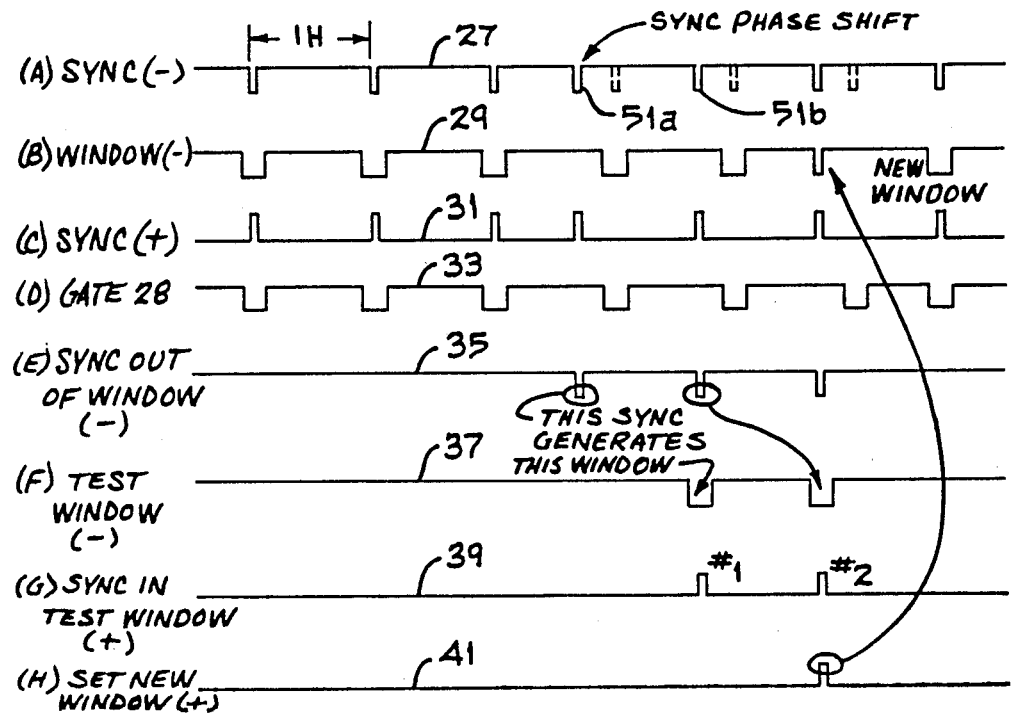
FIG_4

NOISE IMMUNITY WINDOW CIRCUIT

BACKGROUND OF THE INVENTION

This invention relates to a circuit for rejecting noise signals and passing valid signals, and in particular to a circuit for distinguishing between horizontal synchronizing (H sync) pulses derived from an off-tape video signal and spurious noise pulses.

In video tape signal processing systems, a periodic H sync pulse of defined frequency and phase is used to synchronize the horizontal lines of the television image to prevent distortion and instability of the picture. It is generally known that in such video tape systems, video signals recorded on tape and then played back, are subject to variations in speed and tape tension and accompanying phase shifts. Also, phase shifts of the video signal occur due to eccentricities in the mechanical tape drive elements, such as the capstan or drive motor pulleys. In addition, the recorded video signal may contain spurious noise signals which also are recovered on playback. These factors affect the phase and therefore the synchronization of the horizontal lines thus degrading the integrity of the television picture.

In order to provide a reference for indicating when a phase shift has occurred, the video signal includes as a reference a periodic horizontal sync pulse which delineates the beginning of each horizontal line of the television image. However, if there is a phase shift of the reference horizontal sync pulse, the phase shifted pulse will cause the respective horizontal line to be out of alignment, which results in the degradation and distortion of the television picture. Therefore compensation and correction for the undesirable phase shift must be provided to afford a correct representation of the television picture.

SUMMARY OF THE INVENTION

An object of this invention is to provide a circuit that effectively discards noise signals and accepts valid signals.

Another object of this invention is to provide a circuit that maintains noise immunity when there is a phase shift of a signal being processed.

Another object is to track sudden phase shifts in a train of pulses, such as H sync pulses of a video data signal.

According to this invention, a noise immunity circuit for processing a train of periodic pulses subject to spurious noise and phase shift comprises a first channel including a tracking window for delineating valid pulses in a normal locked mode or flywheel mode and for maintaining the correct phase and timing of the periodic pulses. A second channel includes a test window to qualify the pulses processed by the first channel and to generate a new window that is relocked to the train of pulses whenever there is a spurious phase shift or phase step that disrupts the uniform periodicity of the pulses.

BRIEF DESCRIPTION OF THE DRAWINGS

The invention will be described in detail with reference to the drawings in which:

FIG. 1 is a block diagram of the noise immunity window circuit of this invention;

FIGS. 2A-D is a series of waveforms depicting the locking of the circuit window to a periodic synchronizing pulse;

FIGS. 3A-D is a series of waveforms that illustrate the flywheel mode of the circuit; and FIGS. 4A-H is a series of waveforms relating to the relocking of the circuit window in response to a phase step of the periodic pulse.

DESCRIPTION OF THE PREFERRED EMBODIMENT

For purpose of explanation, the invention is described with reference to a video tape system wherein video data including horizontal synchronizing (H sync) pulses are derived from a video data clocking circuit. However, it is to be understood that the noise immunity circuit of this invention is applicable to other systems which require validation of periodic pulses that are subject to noise and phase shift.

With reference to FIG. 1, a periodic horizontal sync pulse signal 11 (FIG. 2A) having a predetermined qualified width is applied to an input line 10. Prior to application of the H sync pulse to the input line, the H sync pulse which is obtained from the recorded tape, is fed through a lowpass filter to a slicing circuit and comparator (not shown). The sliced sync pulse from the comparator is the narrow negative-going pulse SYNC(−) 11, is derived by means of a leading edge detector, and represents the leading edge of the horizontal sync pulse. The width of the pulse 11 if approximately 70 nanoseconds, by way of example.

The negative-going input pulse SYNC(−) 11 is applied to an AND gate 18, and to an inverter 12. During, normal locked mode of operation of the circuit, the SYNC(−) input is a continuous pulse that is centered within a negative-going WINDOW(−) pulse 13 (FIG. 2B) derived from a NOR gate 16. THe SYNC(−) pulse 11 and the WINDOW(−) pulse 13 are applied to the AND gate 18, which generates a positive pulse 15 (FIG. 2C) having the same timing and width as SYNC(−) 11. The AND gate 18 output is applied to NOR gate 20, which in turn generates a negative pulse 17 (FIG. 2D) that is applied to the input of a digital tracking window circuit 14, having a single shot multivibrator 44 and a single shot multivibrator 46 coupled in series. The pulse output 17 from the NOR logic gate 20 triggers the one shot 44 which actuates single shot 46 to generate the next WINDOW(−) pulse 13. The center of the WINDOW(−) pulse 13 is aligned with the leading edge of the trigger pulse 17, so that the period of pulse 13, center to center of successive pulses is substantially on horizontal line. In this locked or tracking mode of the circuit, each new SYNC(−) pulse 11 that arrives within the WINDOW(−) period initiates the generation of a window pulse that is delayed by one horizontal line, and serves to gate the next occurring SYNC(−) pulse. In the event that a sync pulse appears outside the period of the negative-going window pulse, as depicted in FIG. 2A, it is considered a spurious pulse and is rejected by the AND gate 18, which passes only those sync pulses that occur when the window 13 is negative going or low.

In the event that a sync pulse is missing or does not occur within the window period when expected, as illustrated in FIGS. 3A, B, the immunity circuit of this invention operates in a flywheel mode. The tracking window circuit 14 generates a positive pulse 23 via the single shot 46, designated as FLYWHEEL SYNC(+) (FIG. 3C), that is timed from the previous SYNC(−) trigger pulse 19 (which corresponds to the SYNC (−) pulse 11 of FIG. 2A) after a delay of one horizontal line.

The FLYWHEEL sync (+) pulse 23 is fed to the NOR gate 20 and the gated output 25 (FIG. 3D) retriggers the tracking window circuit 14 so that WINDOW pulses continue to be produced although an input SYNC(−) pulse has not appeared after a period of one horizontal line.

In actual operation of a video tape recorder, the input sync pulse train is not always continuous and free of noise or disturbances. The sync signal is sknown to disappear during the interval between the vertical fields and reappear just before the beginning of active video data. Also, due to tape tension error or variations in tape speed, an out-of phase step in SYNC(−) 27 (FIG. 4A) occurs when it reappears, which timing error may be on the order of ±10 microseconds. The circuit of this invention thus also is required to resynchronize rapidly to a new sync phase after verifying that the newly occurring sync pulses are valid and not the result of noise.

As illustrated in FIG. 4, an off-tape SYNC(−) pulse 27 (FIG. 4A) experiences a phase shift or phase step that occurs after a shorter period than that of a horizontal line 1H. The step pulse 51a,b does not fall within the WINDOW(−) pulse 29 (FIG. 4B) which is generated at the output of the NOR gate 16. The phase step pulse 51a, 51b is passed through the inverter 12, and the inverted SYNC(+) signal 31 (FIG. 4C) is applied to NAND gate 24 in conjunction with a second WINDOW(−) pulse 33 (FIG. 4D) provided from the tracking window circuit 14 via a gate 28. The logic gate 24 detects the phase step 51a in the SYNC(−) pulse 27 and produces a SYNC OUT OF WINDOW(−) pulse 35 (FIG. 4E). The pulse 35 from gate 24 triggers a single shot multivibrator 48, which forms part of a test window circuit 22. The single shot 48 triggers a second single shot multivibrator 50, to generate a TEST WINDOW(−) pulse 37 (FIG. 4f) having a delay of one horizontal line relative to the phase step signal 51a. The negative pulse 37 and the negative pulse 35 are applied to logic AND gate 26 which provides a SYNC IN TEST WINDOW(+) pulse 39 (FIG. 4G) representing the new phasing of the SYNC(−) signal 27, for each SYNC OUT OF WINDOW(−) pulse 35 that occurs within the TEST WINDOW(−) pulse 37. In this manner, verification is provided that the incoming SYNC signals occurring after the phase step have the correct period and are not spurious.

A counter circuit 30 counts the number of such "new" sync pulses that occur within the TEST WINDOW, and if a predetermined number of new sync pulses, for example two in this implementation, occur consecutively in accordance with the new phase and at the periods of one horizontal line, the new sync pulses are accepted as valid. The counter 30 then generates a SET NEW WINDOW(+) pulse 41 (FIG. 4H) that has the timing of the new group of sync pulses. The pulse 41 is coupled to the gate 16 to develop a new WINDOW(−) pulse, which passes through logic gates 18 and 20 to trigger the single shot 44 of the tracking window circuit 14 in a corresponding primary tracking window channel, in which the WINDOW(−) pulse is relocked to the new SYNC(−) pulse phasing. By using the test window circuit 22 in a corresponding secondary test window channel to detect and qualify sync pulses, the timing of the primary WINDOW(−) output is not changed, except when a new sync timing is required in the event of a spurious phase shift of the sync pulses. The WINDOW(−) pulse output is provided to the video signal clocking circuit of the tape recording system, as indicated by numeral 9.

There has been described herein a noise immunity circuit that is particulraly useful to compensate for tape dropouts and noise, such as may occur in high speed picture search, for example, in video tape systems. Also, the circuit of this invention corrects for missing or spurious synchronizing pulses which have been shifted in phase relative to previous periodically occurring sync pulses. Although the description has been directed to the use of this circuit in a video tape system, it should be understood that the circuit is also applicable in other systems that use periodically recurring synchronizing pulses.

What is claimed is:

1. A circuit for qualifying a train of input sync pulses occurring successively and periodically at a predetermined time period, including a first channel having a tracking window circuit for providing a timing window having the same predetermined time period, wherein valid sync pulses occurring during said timing window are accepted and spurious pulses or phase shifted sync pulses occurring outside said timing window are rejected, and for providing a sync out of window signal indicative of the occurrence of said phase shifted sync pulses, comprising:

a second channel having a test window circuit, for detecting those valid phase shifted sync pulses which occur periodically at said predetermined time period but are outside the timing window, and for providing a new timing window in said first channel, in coincidence with said valid phase shifted sync pulses having said predetermined time period, only after said valid phase shifted sync pulses have been detected at least a predetermined number of times.

2. A circuit as in claim 1 wherein said test window circuit provides a test window signal having a delay of said predetermined time period relative to the sync out of window signal.

3. A circuit as in claim 2, including a counter in said second channel responsive to said test window signal, for counting the predetermined number of valid phase shifted sync pulses detected by said second channel and for setting said new timing window with a phase shift corresponding to the phase shift of the valid phase shifted sync pulses.

4. A circuit as in claim 3, including tracking logic means responsive to said counter for locking said new timing window in the first channel to said valid phase shifted sync pulses after they have been detected said predetermined number of times to allow qualifying said valid phase shifted sync pulses with said new timing window.

5. A circuit as in claim 3, wherein said tracking logic circuit means includes a logic AND gate disposed to receive said sync pulses, and a NOR gate coupled to the AND gate for supplying trigger signals to said tracking window circuit, and a second NOR gate coupled from the tracking window circuit to said logic AND gate.

6. A circuit as in claim 3, wherein the second channel includes:

logic circuit means responsive to said sync out of window signal and said test window signal, for generating a sync in test window signal; and said counter sets said new timing window in response to said sync in test window signal.

7. A circuit as in claim 6, wherein said logic circuit means includes an AND gate for generating said sync in test window signal and for supplying said sync out of window pulses in coincidence with said test window signal to said counter.

8. A circuit as in claim 1 wherein said tracking window circuit includes a first pair of single shots coupled in series, wherein:
said test window circuit comprises a second pair of single shots coupled in series, for generating a test window signal coincident with said valid phase shifted sync pulses.

9. A circuit as in claim 1, wherein:
said tracking window circuit includes means for providing a continuous flywheel sync pulse in response to the occurrence of an input sync pulse, and for generating, in response to said flywheel sync pulse, a timing window pulse which occurs with said predetermined period to accept the next valid sync pulse in the event of a missing input sync pulse.

10. A method for qualifying a train of input sync pulses which occur successively at a predetermined time period and wherein a timing window is provided for accepting valid sync pulses which occur during said timing window and for rejecting spurious pulses which occur outside said timing window, and wherein a sync out of window signal is generated indicative of phase shifted sync pulses which occur outside said timing window, comprising;
  detecting valid phase shifted sync pulses which occur at said predetermined time period but outside said timing windows;
  generating a test window signal having a delay of said predetermined time period relative to said sync out of window signal; and
  modifying the phase of said timing window in response to said test window signal, to accept those valid phase shifted sync pulses which have said predetermined time period and occur successively at least a predetermined number of times.

11. A method as in claim 10, wherein the step of modifying includes:
  producing a new timing window in coincidence with said valid phase shifted sync pulses at said predetermined time period.

12. A method as in claim 11, including:
  counting the number of said valid phase shifted sync pulses in coincidence with said new timing window; and
  locking the new timing window to said valid phase shifted sync pulses after they occur the predetermined number of times.

13. A method as in claim 10, including:
  generating a flywheeling timing window pulse with said predetermined time period in the absence of an input sync pulse to allow accepting a subsequent valid sync pulse.

* * * * *